United States Patent [19]
Juchniewicz et al.

[11] Patent Number: 6,098,492
[45] Date of Patent: Aug. 8, 2000

[54] DEVICE FOR EXTENDING THE HANDLE OF A WHEELED CART

[76] Inventors: Gregory J Juchniewicz; Joanne S Juchniewicz, both of 54 Groove Ave., Devon, Pa. 19333

[21] Appl. No.: 09/114,121

[22] Filed: Jul. 13, 1998

[51] Int. Cl.[7] .................................................. C12C 5/30
[52] U.S. Cl. ................... 74/551.3; 74/555.1; 280/47.371
[58] Field of Search .............................. 74/551.3, 555.1, 74/544, 546, 547; 280/47.371; 403/97, 59

[56] References Cited

U.S. PATENT DOCUMENTS

| | | | |
|---|---|---|---|
| 3,702,016 | 11/1972 | Keesee | 280/47.371 |
| 4,974,871 | 12/1990 | Mao | 280/47.371 |
| 5,039,118 | 8/1991 | Huang | 280/47.371 |
| 5,056,805 | 10/1991 | Wang | 280/47.36 |
| 5,062,179 | 11/1991 | Huang | 16/111 R |
| 5,168,601 | 12/1992 | Liu | 16/126 |
| 5,184,835 | 2/1993 | Huang | 280/47.371 |
| 5,507,541 | 4/1996 | Chen et al. | 280/47.371 |
| 5,579,556 | 12/1996 | Chung | 16/114 R |
| 5,625,923 | 5/1997 | Huang | 16/115 |

*Primary Examiner*—Charles A. Marmor
*Assistant Examiner*—Tisha D. Waddell
*Attorney, Agent, or Firm*—LaMorte & Associates

[57] ABSTRACT

A handle extension device that is used to alter the position where a person pushes a wheeled item, such as a baby stroller or a lawn mower. This enables the ergonomics of the wheeled item to be optimized for individuals of differing stature. The handle extension device has at least two clamping mechanisms. Each clamping mechanism is adapted to engage one of the existing handle shafts of the wheeled item. Two arm elements extend from the clamping mechanisms. Each arm element extends from a clamping mechanism at a predetermined angle that can be selectively varied. A cross-element interconnects the two arm elements. The length of the cross-element can also be selectively varied so as to fit different sized wheeled items. The cross-element serves as the new push handle. By varying the angle and position of the cross-element and person can position the cross-element to an ergonomically correct orientation.

12 Claims, 5 Drawing Sheets

DEVICE FOR EXTENDING THE HANDLE OF A WHEELED CART

BACKGROUND OF THE INVENTION

1. Field of the Invention

The present invention relates to strollers, lawn mowers and other wheeled carts having push handles. More particularly, the present invention relates to devices that can be used to extend the length and position of the push handles on such items to make the push handle more comfortable to use.

2. Description of the Prior Art

The prior art is replete with many different types of wheeled items that are propelled by push handles. In a typical household, common examples of such wheeled items would include baby carriages, baby strollers and lawn mowers. Such wheeled items share some basic design characteristics. These items have a frame supported by four wheels. A push handle extends from the frame to provide a means for pushing the wheeled item along the ground. However, the length of the push handle, the width of the push handle, the angle of the push handle and the height at which the push handle terminates varies widely from one wheeled item to another.

People come in a wide variety of different shapes and sizes. As such, a handle having a height, length and angle that is ergonomically correct for one person is commonly not ergonomically correct for another person. To minimize the degree of mismatch in handle ergonomics, manufacturers typically design their handles with a theoretical average consumer in mind. For example, a baby stroller manufacturer may design the handle of its baby stroller to comfortably accommodate an average sized woman. Since most of the stroller users will be close to average in size, most of the strollers users will be comfortable with the position of the stroller handle. However, if a very tall or very short person were to push that stroller, they may find the handle practically unusable.

Recognizing that one handle cannot fit all customers, manufacturers have designed handles that can be adjusted in position. Some prior art handle designs enable the length of the handle to be adjusted. These prior art designs are exemplified by U.S. Pat. No. 5,625,923 to Huang, entitled Stroller Length Adjustable Handle, and U.S. Pat. No. 4,587,864 to Kassai, entitled Handle Height Adjusting Mechanism For A Baby Carriage. Some prior art handle designs enable the angle of the handle to be adjusted. These prior art designs are exemplified by U.S. Pat. No. 5,168,601 to Liu, entitled Adjustable Baby Cart Handrail Positioning Device and U.S. Pat. No. 5,039,118 to Huang entitled Stroller With An Improved Connector.

A problem with such prior art adjustable handle designs is that the adjustment mechanism is built directly into the wheeled item. Accordingly, in order for a woman to own a stroller with an adjustable handle, she must disregard her old stroller and purchase a new more expensive stroller that contains the adjustable handle features. A need therefore exists for a device that can be retroactively added to an existing wheeled item that enables the handle of that item to be adjusted in both angle and length. In this manner, the handle of a stroller, lawn mower or the like can be adjusted to the needs of its owner without having to purchase a more expensive adjustable model.

SUMMARY OF THE INVENTION

The present invention is a handle extension device that is used to alter the position where a person pushes a wheeled item, such as a baby stroller or a lawn mower. This enables the ergonomics of the wheeled item to be optimized for individuals of differing stature. The handle extension device has at least two clamping mechanisms. Each clamping mechanism is adapted to engage one of the existing handle shafts of the wheeled item. Two arm elements extend from the clamping mechanisms. Each arm element extends from a clamping mechanism at a predetermined angle that can be selectively varied. A cross-element interconnects the two arm elements. The length of the cross-element can also be selectively varied so as to fit different sized wheeled items. The cross-element serves as the new push handle. By varying the angle and position of the cross-element and person can position the cross-element to an ergonomically correct orientation.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Although the present invention can be used on any wheeled item having a push handle, such as a lawn mower, a push cart or the like, the present invention is particularly well suited for use on baby strollers. Accordingly, by way of example, the present invention device will be shown applied to the handle of a baby stroller in order to set forth the best mode contemplated for the invention.

Figure 1:
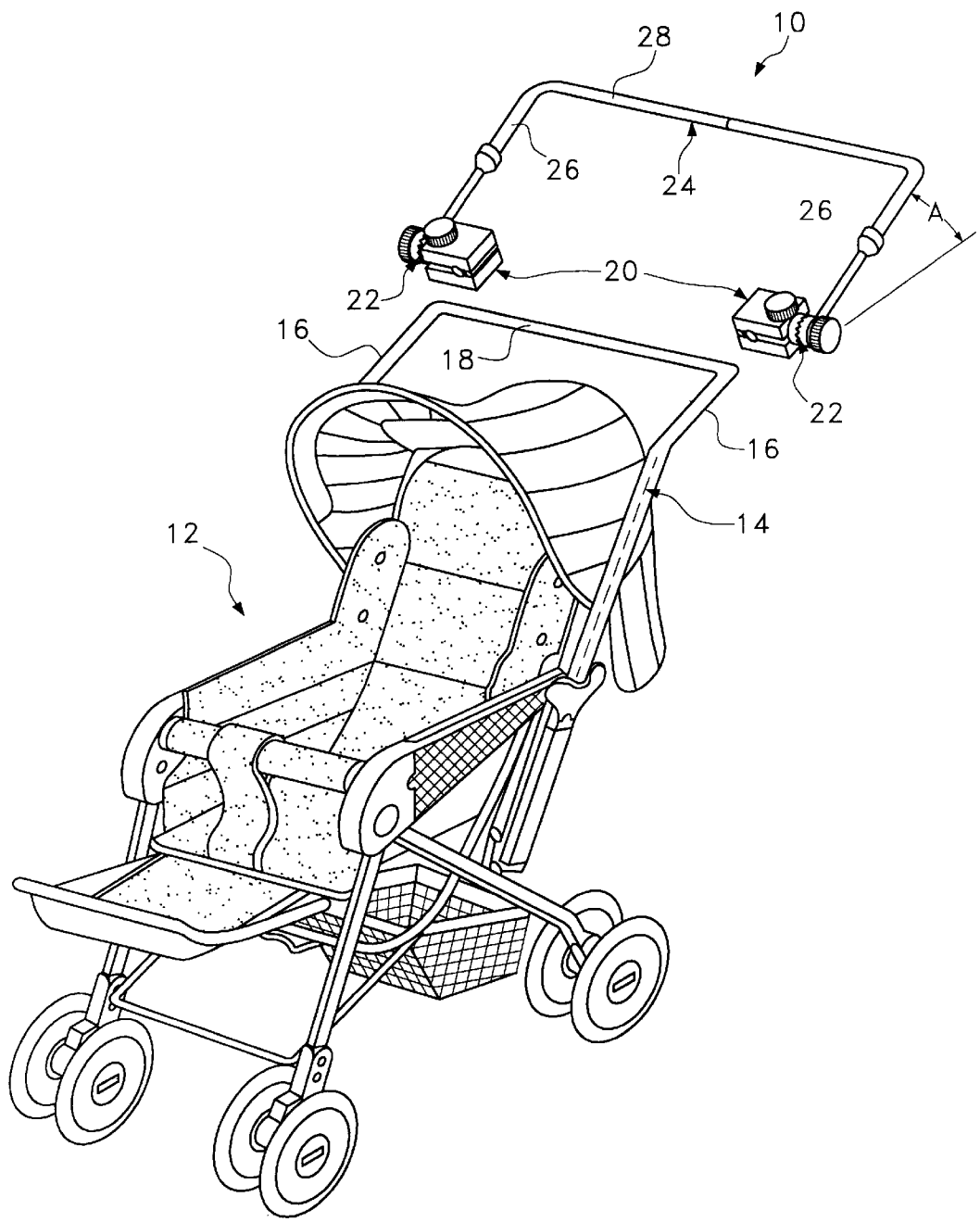
FIG. 1 is a perspective view of an exemplary handle extension device shown in conjunction with a typical prior art baby stroller.

Referring to FIG. 1, an exemplary embodiment of a handle extension device 10 is shown in accordance with the present invention. The handle extension device 10 is shown in conjunction with a prior art baby stroller 12. The baby stroller 12 contains a push handle 14. The push handle 14 is comprised of two lateral arms 16 that support a cross-member 18. The lateral arms 16 and cross-member 18 are rigid and cannot be adjusted in height, length or angle.

Depending upon the model of the baby stroller 12, the lateral arms 16 can be manufactured from round stock, square stock or rectangular stock. Furthermore, not all models of strollers have a cross-member. Rather, in certain models of strollers, each of the lateral arms terminates with an umbrella handle and no cross-member is present.

The handle extension device 10 contains two clamping mechanisms 20 that attach to the lateral arms 16 of the stroller. As will later be explained, the clamping mechanisms 20 are capable of engaging the lateral arms 16 regardless to whether they are fabricated from round stock, square stock or rectangular stock.

A hub assembly 22 is attached to each of the clamping mechanisms 20. The hub assemblies 22 interconnect a handle assembly 24 to the clamping mechanisms 20. As will be later explained, the hub assemblies 22 retain the handle assembly 24 at a predetermined angle A with respect to the horizontal. The hub assemblies 22 enable a person to selectively adjust the predetermined angle A as desired.

The handle assembly 24 contains two side arms 26 and a cross-arm 28 that interconnects the two side arms 26. As will later be explained, the two side arms 26 have a length that can be adjusted as desired. Since the length of the handle assembly 24 and the angle A of the handle assembly 24 can be adjusted to the needs of its user, the handle adjustment device 10 enables the stroller to be ergonomically adjusted to the requirements of the person pushing the stroller.

Figure 2:
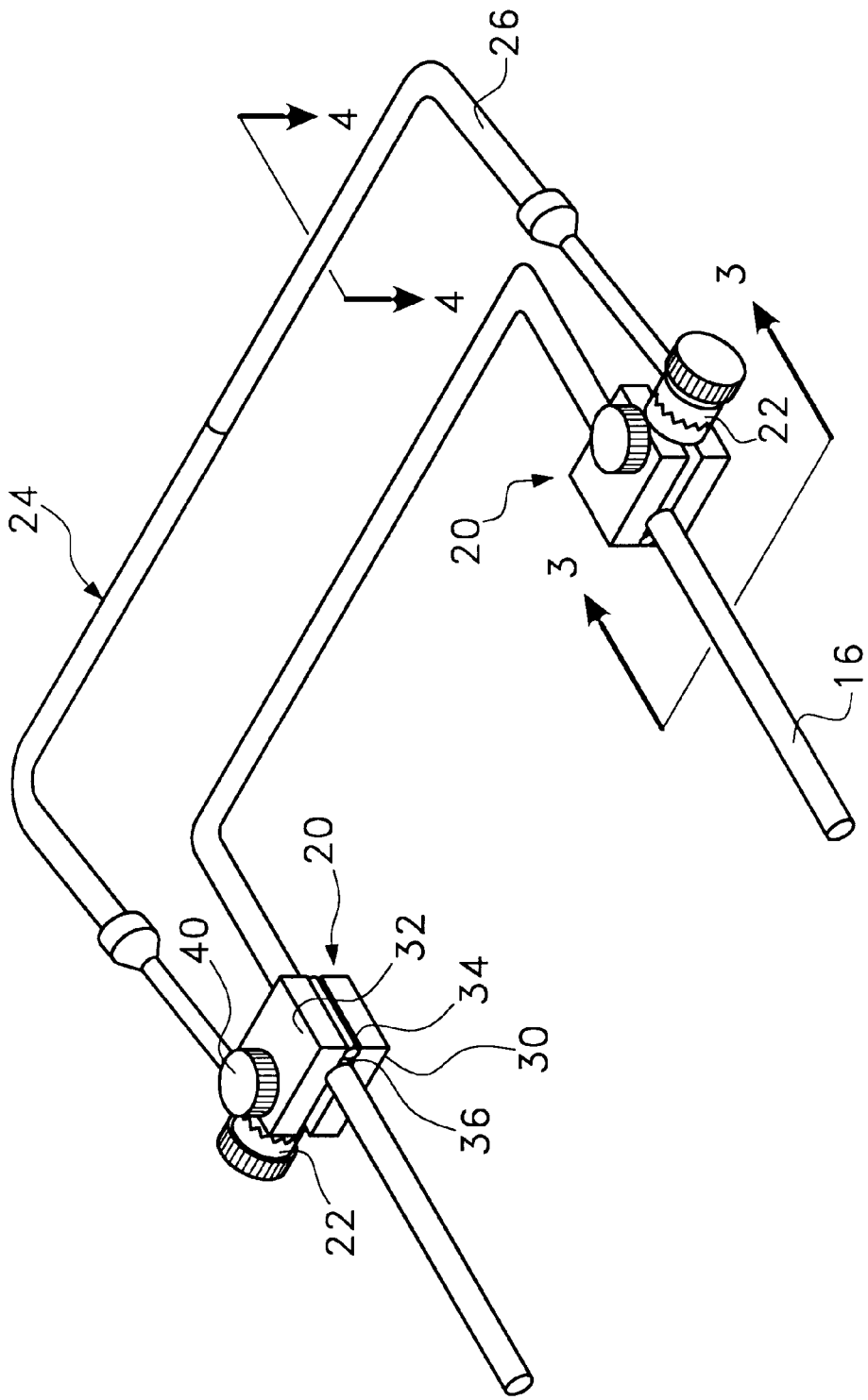
FIG. 2 is a perspective view of the embodiment of the handle extension device of FIG. 1, shown attached to the handle of a baby stroller.
Figure 3:
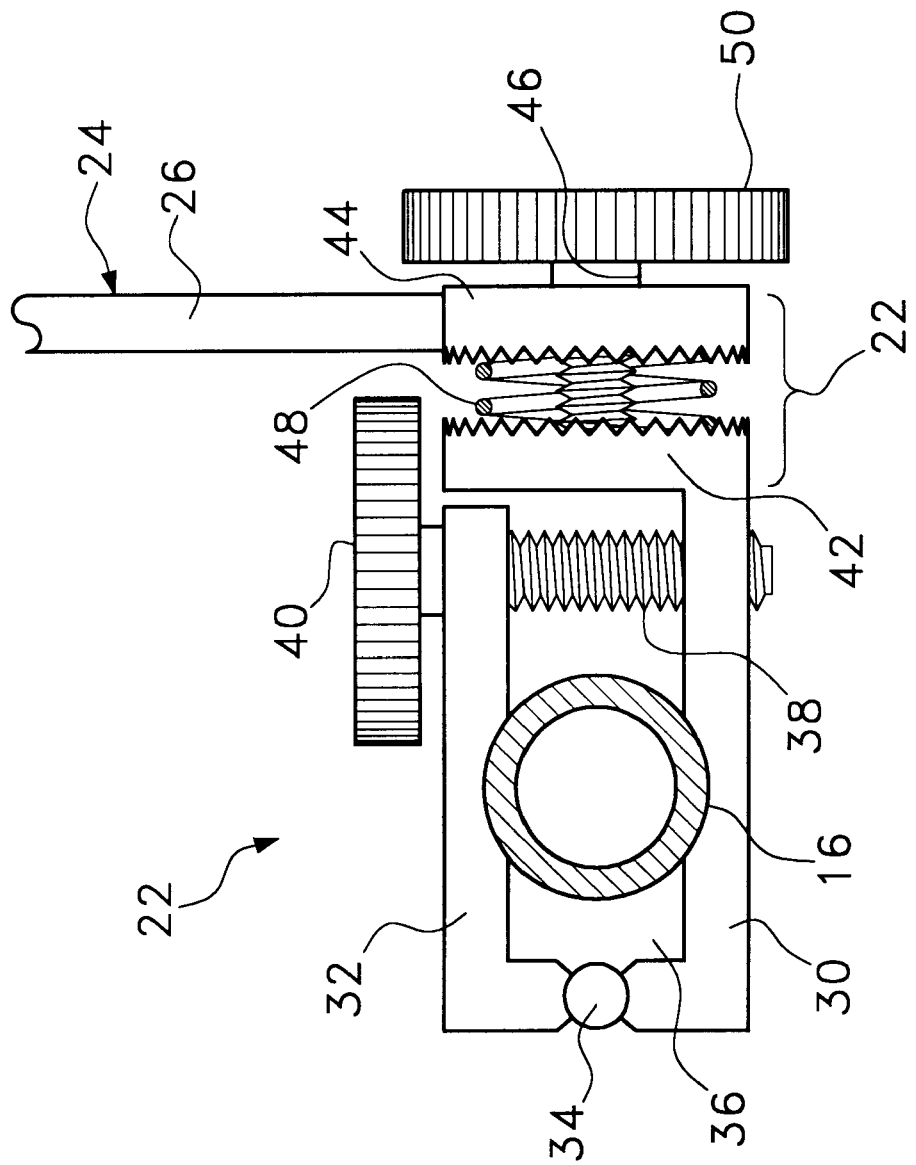
FIG. 3 is a cross-sectional view of the embodiment of FIG. 2, shown along section line 3—3.

Referring To FIG. 2 in conjunction with FIG. 3, it can be seen that each clamping mechanism 20 contains a base bracket 30. A clamp arm 32 is attached to one end of the base bracket 30 at a hinged joint 34. The clamp arm 32, when positioned over the base bracket 30, defines a generally rectangular shaped opening 36. A bolt 38 (FIG. 3) passes through the clamp arm 32 and engages the underlying base bracket 30. When the bolt 38 is tightened, the clamp arm 32 is biased toward the base bracket 30 and the area within the rectangular shaped opening 36 is decreased. Conversely, when the bolt 38 is loosened, the area within the rectangular shaped opening 36 is increased. If the bolt 38 is loosened to a point where the bolt 38 no longer engages the base bracket 30, the clamp arm 32 is free to rotate about the hinged joint 34, thereby fully opening the formally rectangular shaped opening 36. The bolt 38 preferably terminates with an enlarged knob 40 that facilitates the rotation of the bolt 38 by hand.

A slight arcuate relief is formed in both the clamp arm 32 and the base bracket 30. The arcuate relief enables the clamp mechanism 20 to better clamp against a piece of round stock, as is shown in FIG. 3. Furthermore, since the rectangular opening 36 has a flat sides, the rectangular opening 36 easily receives and engages a piece of square stock or rectangular stock.

Referring solely to FIG. 3, it can be seen that the hub assemblies 22 that attach the handle assembly 24 to the clamping mechanisms 20 includes a first toothed disk 42 that is part of the base bracket 30. The first toothed disk 42 has a face surface wherein teeth radially extend from the center of the disk face. Each of the hub assemblies 22 also includes a second toothed disk 44 that is concentrically joined to the first toothed disk 42 by a bolt 46. The second toothed disk 44 has a face surface that is a mirror image of the face of the first toothed disk 42, thereby enabling the face of the first toothed disk 42 to intermesh with the face of the second toothed disk 44. Due to the radial pattern of teeth on both the first toothed disk 42 and the second toothed disk 44, the two disks can be intermeshed at numerous points as the second toothed disk 44 rotates around the bolt 46.

The bolt 46 passes through the center of the second toothed disk 44 and the first toothed disk 42. As the bolt 46 is tightened, the second toothed disk 44 is forced to intermesh with the first toothed disk 42 and two disks become firmly affixed together. However, when the bolt 46 is loosened, the teeth of the first toothed disk 42 and the second toothed disk 44 may separate and the second toothed disk 44 is free to rotate independently of the first toothed disk 42. An optional spring element 48 can be placed between the first toothed disk 42 and the second toothed disk 44. The spring element 48 acts to separate the second toothed disk 44 from the first toothed disk 42 as the bolt 46 is loosened.

The bolt 46 used to interconnect the first toothed disk 42 with the second toothed disk 44 preferably terminates with a knob 50 that enables the bolt 46 to be readily turned by hand.

The side arms 26 of the handle assembly 24 terminate within the second toothed disk 44. As a result, when the second toothed disk 44 is rotated with respect to the first toothed disk 42, the entire handle assembly 24 rotates.

Figure 4:
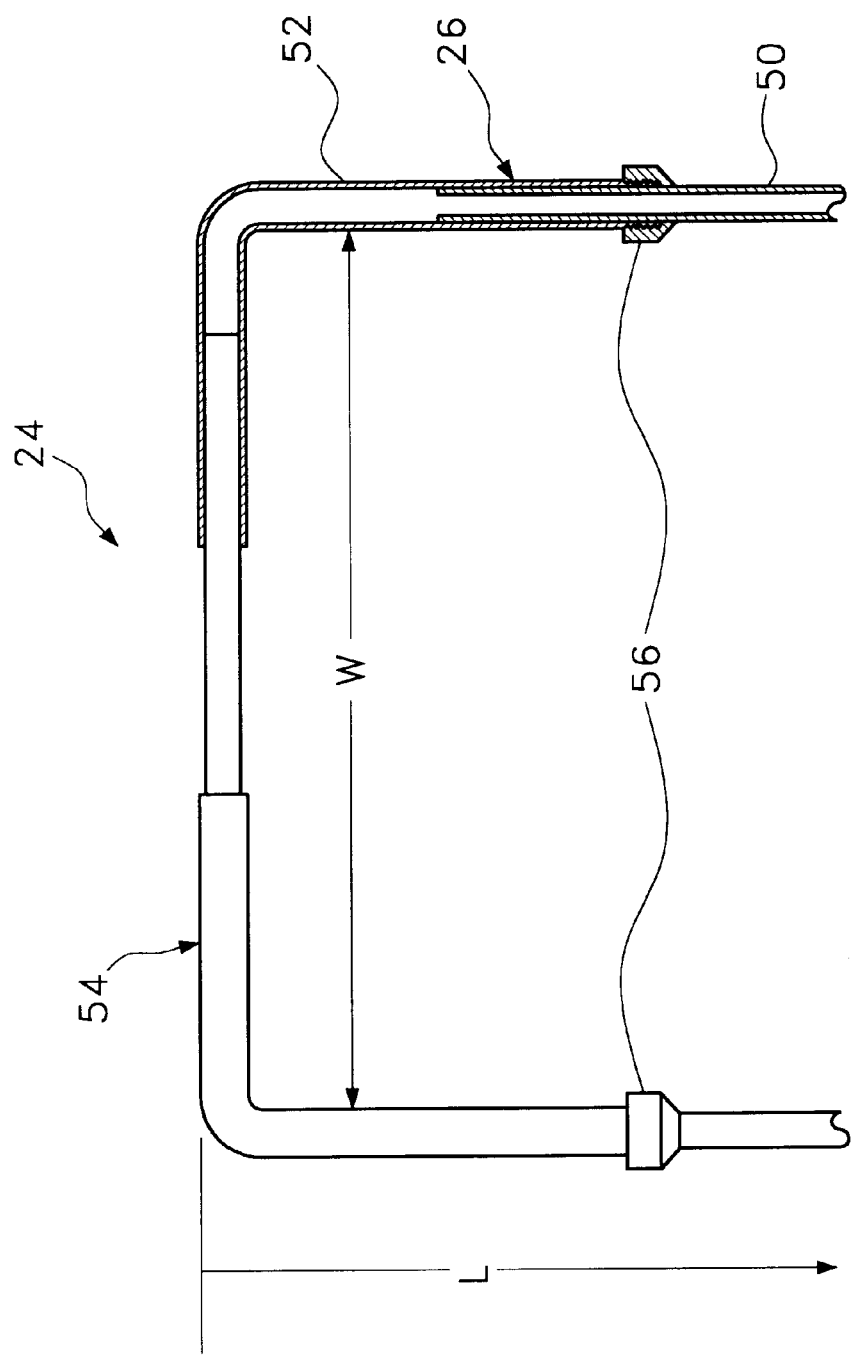
FIG. 4 is a cross-sectional view of the embodiment of FIG. 2, shown along section line 4—4.

Referring to FIG. 4, it can be seen that each of the side arms 26 in the handle assembly 24 has a telescoping configuration. The side arms 26 include a first tubular element 50 that is affixed at one end to the second any toothed disk 44 (FIG. 3). The first tube element 50 passes into a slightly larger second tube element 52. The second tube element 52 is bent and forms part of the cross-member 54 of the handle assembly 24. The ends of the second tube element 52 that receive the first tube element 50 are both threaded and slotted. A collar element 56 passes over the ends of the second tube element 52 and engage the threading. As the collar elements 56 are tightened on the threading, the ends of the second tube element 52 are compressed. This causes the second tube element 52 to engage the inner first tube element 50 and lock the first tube element into a set position. Accordingly, by loosening the collar elements 56, the first tube element 50 can be moved telescopically within the second tube element 52 until a desired length L for the handle assembly 24 is achieved. Once a desired length L is achieved, the collar elements 56 are tightened until the first tube element 50 can no longer move independently of the second tube element 52. At that point, the effective length L of the handle assembly 24 becomes set into place.

Different models of strollers have different widths between the arms of their handles. Accordingly, the present invention handle extension device is also adjustable in width so that it may accommodate the varying widths of different strollers. In FIG. 4, it can be seen that the second tube element 52 may have a telescoping configuration at some point near its midpoint. Accordingly, the effective width W of the handle extension device 24 can be selectively adjusted to meet the width of the stroller upon which it is being attached.

Figure 5:
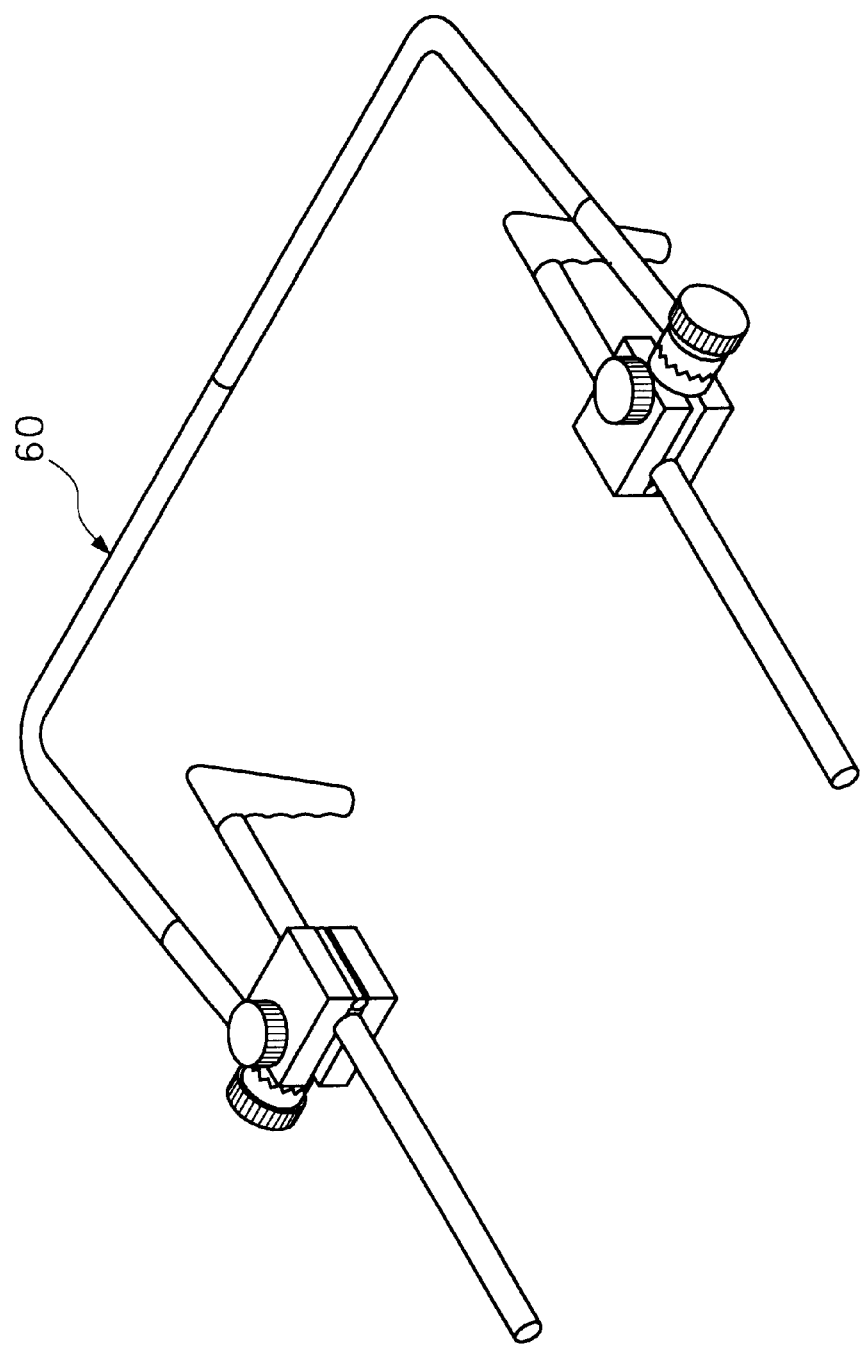
FIG. 5 is a perspective view of an alternate embodiment of a handle extension device.

Referring to FIG. 5, a version of the present invention handle extension device 60 is shown attached to a stroller that does not have a handle with a cross-member. Since the embodiment of the present invention connects directly to the arms of the stroller, the presence of a cross-member is irrelevant and the handle extension device 60 can be applied.

It will be understood that a person skilled in the art can make alternate embodiments of the present invention using functionally equivalent components that have not been specifically described. For example, there are many different ways to create a lockable telescoping configuration, the side arms and cross-element of the extension handle assembly. Furthermore, there are many types of clamping mechanisms and hub assemblies that exist in the prior art that can be substituted for the components specifically described. All such modifications are intended to be included in the scope of this disclosure as defined by the appended claims.

What is claimed is:

1. A handle extension device, comprising:

two clamping mechanisms, wherein each clamping mechanism is capable of being selectively clamped onto an elongated shaft;

two arm elements, coupled to said two clamping mechanisms, respectfully, wherein each arm element extends from a clamping mechanism at a predetermined angle; and a cross-element interconnecting said two arm elements, wherein said cross-element has a predetermined length: and an adjustment mechanism for selectively varying said predetermined length of said cross element.

2. The device according to claim 1, wherein each of said arm elements extends a predetermined distance from said clamping mechanisms and said device includes an adjustment mechanism for selectively varying said predetermined distance.

3. The device according to claim 1, wherein each of said arm elements includes a telescoping arrangement that enables each of said arm elements to be selectively varied in length.

4. The device according to claim 1, wherein said cross-element includes a telescoping arrangement that enables each of said arm elements to be selectively varied in length.

5. The device according to claim 1, further including an angle adjustment means for selectively varying said predetermined angle at which said arm elements extends from said clamping mechanisms.

6. The device according to claim 1, further including hub assemblies disposed between said arm elements and said clamping mechanisms, wherein said hub assemblies enable said predetermined angle between said arm elements and said clamp mechanisms to be selectively varied.

7. The device according to claim 6, wherein said hub assembly includes a first toothed disk that is affixed to said clamping mechanism, a second toothed disk that is affixed to an arm element, and a bolt that biases said second toothed disk against said first toothed disk causing both disks to intermesh.

8. The device according to claim 7, wherein each hub assembly contains a spring element disposed between said first toothed disk and said second toothed disk that biases said second toothed disk away from said first toothed disk.

9. The device according to claim 1, wherein each clamping mechanism includes:

a base bracket;

a clamp arm having a first end and a second end, wherein said first end is attached to said base bracket with a hinged connection; and a bolt passing through said clamp arm proximate its second end and engages said base bracket, wherein said base bracket and said clamp arm define a opening that can be selectively varied in size by tightening and loosening said bolt.

10. The device according to claim 9, wherein said opening defined by said base bracket and said clamp arm has a top surface and a bottom surface, wherein said top surface and said bottom surface include opposing arcuate reliefs.

11. A handle extension device, comprising:

two clamping mechanisms, wherein each clamping mechanism is capable of being selectively clamped onto an elongated shaft:

two arm elements, coupled to said two clamping mechanisms, respectfully, wherein each arm element extends from a clamping mechanism at a predetermined angle; and a cross-element interconnecting said two arm elements, wherein said cross-element includes a telescoping arrangement that enables each of said arm elements to be selectively varied in length.

12. A handle extension device, comprising:

two clamping mechanisms, wherein each clamping mechanism is capable of being selectively clamped onto an elongated shaft;

two arm elements, coupled to said two clamping mechanisms, respectfully, wherein each arm element extends from a clamping mechanism at a predetermined angle; and a cross-element interconnecting said two arm elements;

hub assemblies disposed between said arm elements and said clamping mechanisms, said hub assembly including a first toothed disk that is affixed to said clamping mechanism, a second toothed disk that is affixed to an arm element, and a bolt that biases said second toothed disk against said first toothed disk causing both disks to intermesh, wherein said hub assemblies enable said predetermined angle between said arm elements and said clamp mechanisms to be selectively varied.

* * * * *